United States Patent
Segerstrom et al.

[11] Patent Number: 6,154,317
[45] Date of Patent: Nov. 28, 2000

[54] DEVICE FOR STABILIZING OF A REMOTELY CONTROLLED SENSOR, LIKE A CAMERA

[75] Inventors: Torbjorn Segerstrom; Kjell Noren, both of Malmkoping, Sweden

[73] Assignee: Polytech AB, Malmkoping, Sweden

[21] Appl. No.: 09/284,287

[22] PCT Filed: Sep. 30, 1997

[86] PCT No.: PCT/SE97/01650
§ 371 Date: Apr. 30, 1999
§ 102(e) Date: Apr. 30, 1999

[87] PCT Pub. No.: WO98/16871
PCT Pub. Date: Apr. 23, 1998

[30] Foreign Application Priority Data
Oct. 11, 1996 [SE] Sweden .................................. 9603716

[51] Int. Cl.$^7$ .................................................. G02B 27/64
[52] U.S. Cl. ............................ 359/554; 396/13; 396/52; 396/55; 250/203.1; 250/203.6; 74/5.22
[58] Field of Search ..................................... 359/554, 555, 359/556, 557; 396/52, 53, 54, 55, 13; 250/203.1, 203.6; 74/5.22; 248/182.1, 183.1, 183.2

[56] References Cited

U.S. PATENT DOCUMENTS

| 3,813,788 | 6/1974 | Johnston | 33/321 |
|---|---|---|---|
| 4,158,261 | 6/1979 | Auer | 33/324 |
| 4,973,144 | 11/1990 | Malige | 359/554 |
| 5,237,450 | 8/1993 | Stromberg . | |
| 5,868,031 | 2/1999 | Kokush | 74/5.34 |

*Primary Examiner*—Cassandra Spyrou
*Assistant Examiner*—Leo Boutsikaris
*Attorney, Agent, or Firm*—Young & Thompson

[57] ABSTRACT

A device for stabilizing of a remotely controlled sensor like a camera includes a gimbal system with an inner yaw gimbal carrying the sensor and an outer yaw gimbal and an inner pitch gimbal and outer pitch gimbal; and inner yaw and pitch gimbals are stabilized by a two-axes self-acting rategyro and outer yaw and pitch gimbals are stabilized by a system with set motors, electric rategyros and an electronic unit and a mechanical coupling with a resilient coupling connecting the inner yaw gimbal with the outer pitch gimbal.

6 Claims, 3 Drawing Sheets

DEVICE FOR STABILIZING OF A REMOTELY CONTROLLED SENSOR, LIKE A CAMERA

BACKGROUND OF THE INVENTION

The present invention relates to a device for stabilizing of a remotely controlled sensor, of the art disclosed in the preamble of enclosed 1:st patent claim.

DESCRIPTION OF THE RELATED ART

In civil and military contexts surveillance towards an object for achieving information of some art are common. The surveillance is usually performed by some type of sensor, e g a video camera, an infrared camera or the like. The sensor is usually mounted at a vehicle, i e a boat, an automobile, an aircraft, a helicopter etc. in order to facilitate the surveillance the sensor is usually remotely controlled from an operator's site in the vehicle. As the vehicle normally moves, and this also is the case for the object, thus the sensor has to be remotely controlled. The degrees of freedom are primarily two, that is to say in yaw (azimuth) and pitch (elevation). In this design the aiming line of the sensor can be directed towards the object. When the vehicle moves, the operator has no time to continuously compensate by remote control for occurring angle deviations between the aiming line of the sensor and the object The result is, that the object gets outside of the aiming line of the sensor, or that the image created by the sensor of the object will not be sharp. Until now this problem has been solved by providing the sensor with a two-axes electrical rategyro, which momentarily measures the angle error, that the sensor is subject to, and by controlling the space position of the sensor with an electronic system, so that this space position remains stable. This constructive solution is very expensive as it has to comprise mechanics of a high precision, servo systems of a high class and rate gyros with good function.

SUMMARY OF THE INVENTION

The object of the present invention is to achieve a device of the art disclosed in the preamble of the enclosed 1:st patent claim, provided with components of reasonable costs, yet with equally good function as devices designed according to the constructional solution just mentioned.

According to the invention, such a device is characterized primarily in that a mechanical coupling, comprising a resilient coupling means, connects the first gimbal to the third gimbal,

BRIEF DESCRIPTION OF THE DRAWINGS

The invention will be described more in detail, reference being made to the attached perspective figures, of which.

DESCRIPTION OF THE PREFERRED EMBODIMENTS

Figure 1:
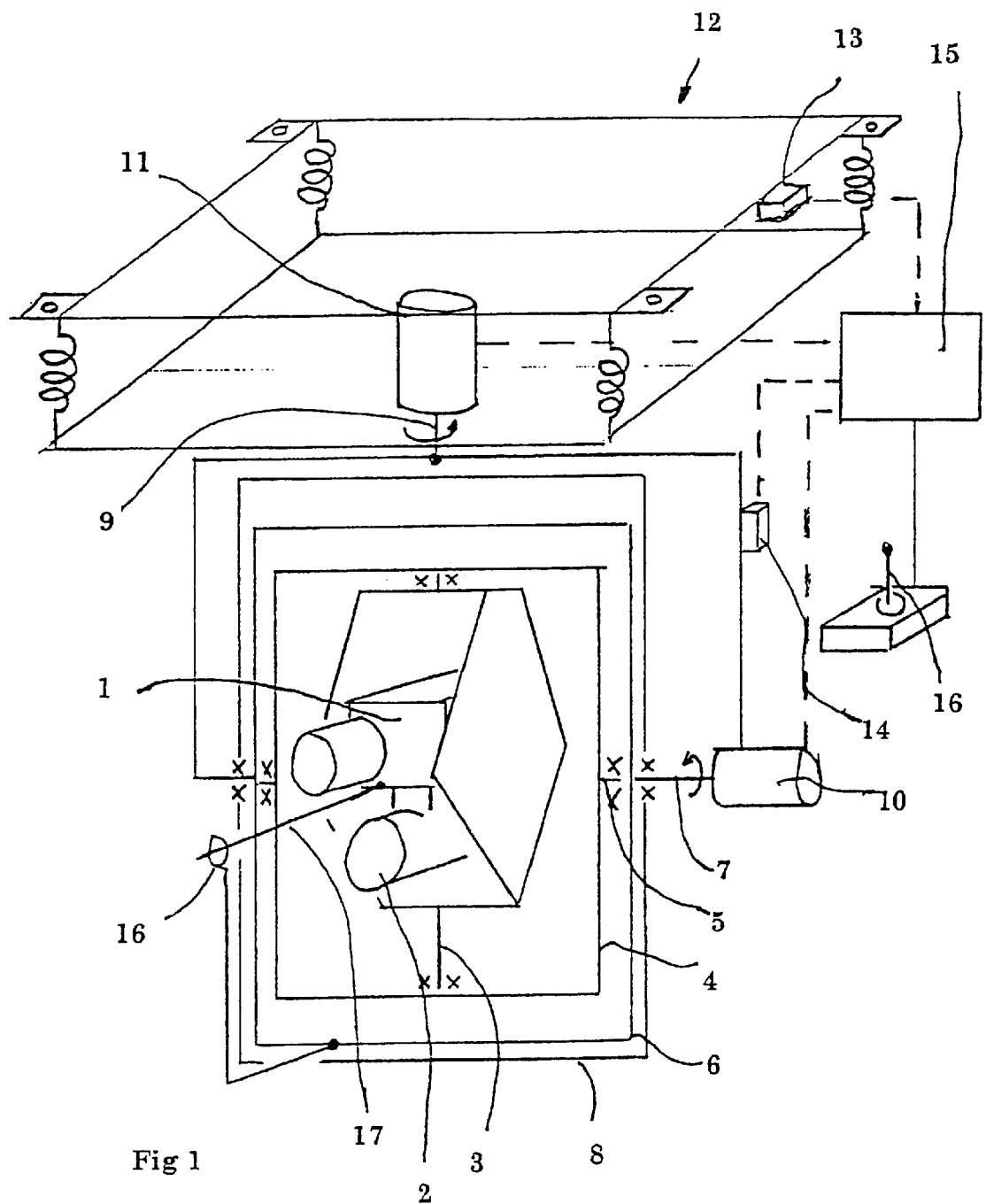
FIG. 1 shows an embodiment of a device according to the invention.

In FIG. 1 a sensor, in this case a video camera, is denoted by 1. It is provided with a two-axes, i e in yaw and pitch stabilizing self-acting rategyro 2, and the sensor is arranged as an inner first gimbal 1, rotatable around a first yaw axis 3. This is journalled in a second gimbal 4, which is rotatable around a first pitch axis 5. This is journalled in an outer, third gimbal 6, rotatable around a second pitch axis 7, journalled in a fourth gimbal 8. This is rotatable around a second yaw axis 9. A first set motor 10 is fastened to the fourth gimbal and is provided to set the angle position of the second pitch axis 7. A second set motor 11 is fastened to a stand 12, which in turn is fastened to a vehicle like a helicopter. This second set motor 11 is provided to set the angle position of the second yaw axis 9. A first electric rategyro 13 is fastened to the stand 12 to sense the yaw angle rate and a second electric rategyro 14 is fastened to the fourth gimbal 8 to sense the pitch angle rate. A electronic unit 15 receives signals from said rategyros and controls the first and the second set motor 10 resp 11 so that these act stabilizing on the third gimbal 6 and the fourth gimbal 8. The set motors 10 and 11 can also be acted upon to set the sensor 1 in pitch and yaw by signals from a set means 16, via the electronic unit 15.

A mechanical coupling, comprising an arm 17 directed perpendicularly to the plane of the first yaw axis and the first pitch axis 5 from the intersecting point of these is provided with a resilient coupling means 16 at the rotational area (surface edge) of the third gimbal 6. The coupling means consists, in this embodiment, of a plate of an elastomer like polyurethane foam in the center embracing the end of the arm 17. Depending on the design and the application the stiffness of the foam respecting the spring constant of the springs, if such are utilized, have to be adapted to the demand. Generally it can be said, that the stabilizing, self-acting rategyro has for an object to compensate vibrations down to about 12 Hz, whilst the control device, comprising rategyros, set motors and electronic unit just described has for an object to compensate for more low-frequent vibrations. The direction of the arm 17 does not have to be the one described, but the more the direction deviates from the said one, the worse the function will be.

Figures 2, 3:
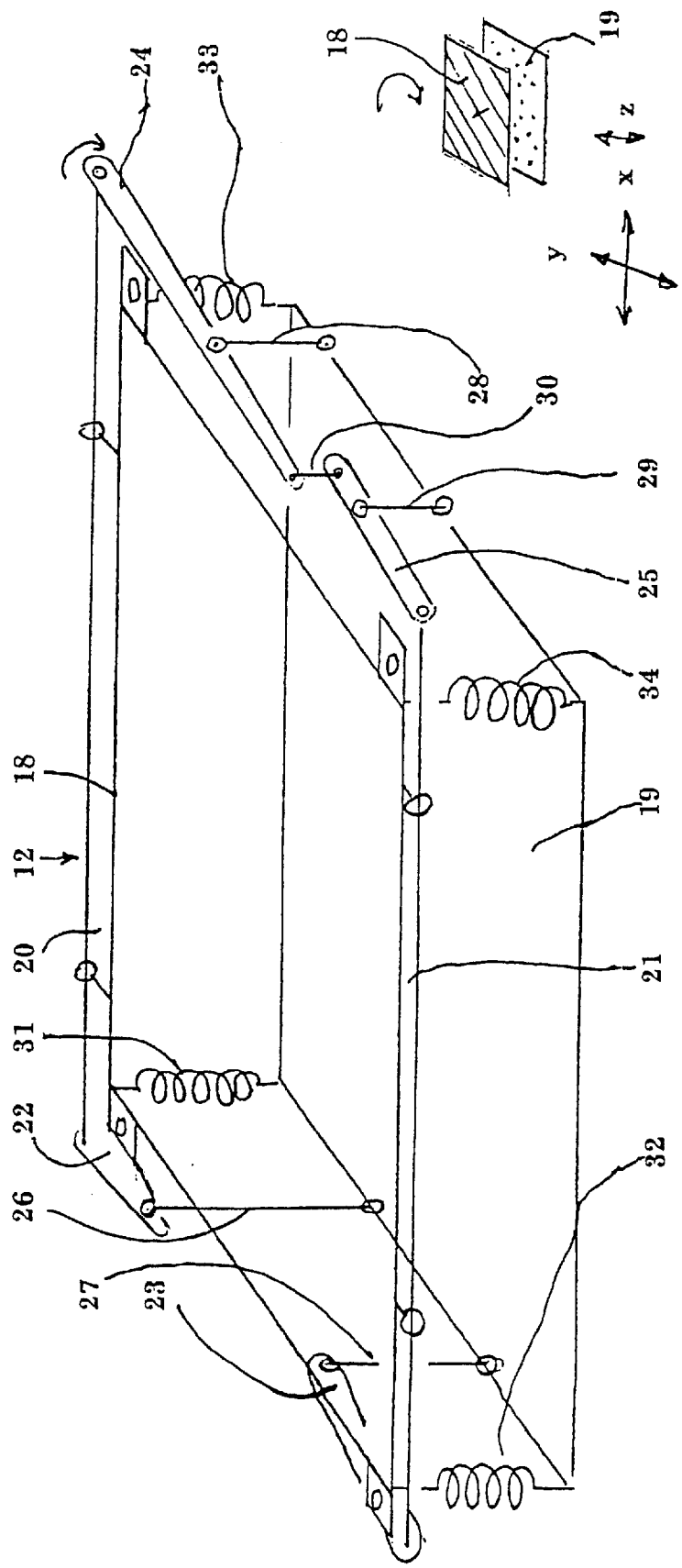
FIG. 2 shows a stand, comprised in the device in FIG. 1.
FIG. 3 shows a three-axes right-angular coordinate system with the directions x, y and z.

In FIG. 2 the stand 12 is shown more in detail. The stand comprises an upper frame 18, intended to be fastened to a vehicle, and a lower frame 19. Both frames are rectangular. At the corners they are connected by four spring elements 31, 32, 33 and 34. The lower frame is thus resiliently movable in a three-axes right-angular coordinate system with the directions x, y and z, as is shown in FIG. 3. The lower frame is also to some degree turnable in relationship to the upper frame. By the aid of a special design the parallelity between the frames is also retained in all directions of movement of the lower frame in relationship to the upper frame.

In the upper frame 18 there are namely, at two opposed sides, turnably journalled a first and a second torsion axis 20, 21, extending along the entire length of the the first frame 18. At the outer ends of the torsion axes there are provided, at right angle to the torsion axes, in the direction inward to the frame, four torsion arms. The first 22 and the second 23 are fastened at one end of the first resp the second torsion axis 20, 21, whilst the third 24 and the fourth 25 are fastened to the other end of the first resp the second torsion axis 20, 21. First and second links 26 and 27 are journalled at two ends, with one end at the first resp the second torsion arm 22, 23 and with the other end journalled at the lower frame 19, whilst the third arm torsion arm 24, at a distance from its outer end is connected to the lower frame 19 via a third link 28, journalled at two ends. The fourth torsion arm 25 is, at a distance from its outer end connected to the lower frame 19, via a fourth link 29, journalled at two ends, whilst the the third and fourth torsion arms 24 and 25 in their outer ends are swingably connected to a fifth link 30, journalled at two ends. The bearings of the links are such, that some movement at right angle to their plane of rotation is allowed.

Figure 4:
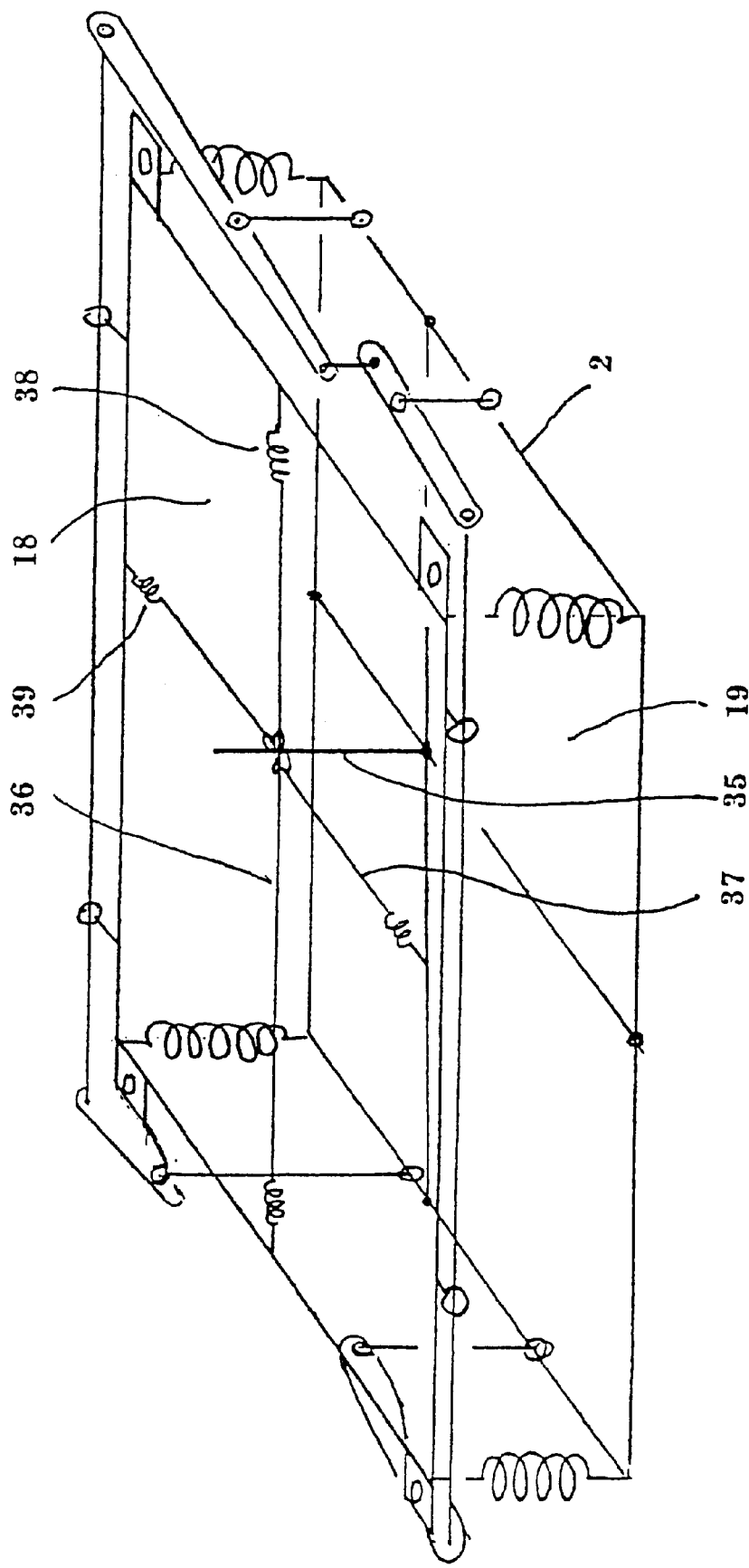
FIG. 4 shows a special embodiment of the stand in FIG. 2.

The spring elements 31–34 admit, per se, a certain resilient stability laterally, but in order to warrant this, a device according to the invention as in FIG. 4 may be provided. A column 35 is stiffly fastened to the lower frame at the middle of its horizontal plane. It is directed vertically upwards towards the upper frame 18, and fifth to eighth spring elements 36, 37, 38 and 39 forming a resilient cross, connect the upper portion of the column with the sides of the upper frame. With this arrangement the lower frame is retained resiliently in its lateral position in relationship to the upper frame, whilst a certain mutual rotational movability between the frames is retained.

What is claimed is:

1. A device for stabilizing of a remotely controlled sensor, comprising:
    a sensor provided with a two-axes yaw and pitch stabilizing self-acting rategyro, which sensor is provided as a first gimbal, turnable around a first yaw axis, journalled in an inner, second gimbal;
    said second gimbal being in turn turnable around a first pitch axis, and being journalled in an outer third gimbal, turnable around a second pitch axis;
    said third gimbal being journalled in a fourth gimbal, turnable around a second yaw axis;
    a first set motor being provided, fastened to the fourth gimbal, acting upon the second pitch axis;
    a second set motor being provided fastened to a stand fastened to a vehicle, acting upon the second yaw axis;
    a first rategyro being fastened to the stand for sensing of the yaw angle rate;
    a second rategyro being fastened to the fourth gimbal for sensing of the pitch angle rate;
    an electronic unit being provided acting, under the influence of signals from the first and second rategyro via the first and second set motor, to stabilize the third gimbal and the fourth gimbal;
    the set motors being acted upon via the electronic unit for controlling of the sensor in pitch and yaw; and
    a mechanical coupling, comprising a resilient coupling means, connecting the first gimbal to the third gimbal.

2. A device according to claim 1, wherein the mechanical coupling comprises an arm directed preferably at a right angle to a plane defined by the first yaw axis and the first pitch axis from the intersection point for those and
    the coupling means being connected to the third gimbal at a rotational surface edge.

3. A device according to claim 1, wherein the stand comprises:
    an upper frame intended to be fastened to a vehicle;
    and a lower frame provided resiliently depending on the upper frame,
    wherein the lower frame is provided to be resiliently movable in all directions of a three-axes right angle coordinate system and to be somewhat turnable around the vertical coordinate axis, retaining the parallelity between the upper frame and the lower frame.

4. A device according to claim 3, wherein the upper frame and the lower frame are substantially rectangular;
    in the upper frame at two opposed sides are journalled a first and a second torsion axis extending along the entire length of the upper frame;
    at the outer ends of the torsion axes there are provided, at right angle to the torsion axes, in the direction inward to the first frame, four torsion arms;
    the first and the second torsion arms being fastened at one end of the first and the second torsion axis,
    the third and the fourth torsion arms being fastened to the other end of the first and the second torsion axis;
    first and second links are journalled at two ends, with one end connected at the end of the first and the second torsion arms and with the other end journalled at the lower frame;
    the third torsion arm, at a distance from its outer end is connected to the lower frame via a third link, the third link being journalled at two ends;
    the fourth torsion arm is, at a distance from its outer end connected to the lower frame via a fourth link, the fourth link being journalled at two ends;
    the third and fourth torsion arms at their outer ends are swingably connected to a fifth link, the fifth link being journalled at two ends; and
    the upper and lower frames at their four corners are connected to first through fourth spring elements.

5. A device according to claim 3, wherein a column is rigidly fastened at the lower frame, substantially at its center of gravity directed substantially vertically towards the upper frame, and
    fifth to eighth spring elements connect the upper portion of the column to the sides of the upper frame,
    whereby the lower frame is resiliently retained in position laterally in relationship to the upper frame, whilst a certain mutual rotational movement between the frames is retained.

6. A device according to claim 4, wherein a column is rigidly fastened at the lower frame, substantially at its center of gravity directed substantially vertically towards the upper frame, and
    fifth to eighth spring elements connect the upper portion of the column to the sides of the upper frame,
    whereby the lower frame is resiliently retained in position laterally in relationship to the upper frame, whilst a certain mutual rotational movement between the frames is retained.

* * * * *